US011193950B2

(12) United States Patent
von Bueren et al.

(10) Patent No.: US 11,193,950 B2
(45) Date of Patent: Dec. 7, 2021

(54) SLIDE IDENTIFICATION SENSOR

(71) Applicant: SAKURA FINETEK U.S.A., INC., Torrance, CA (US)

(72) Inventors: Erico von Bueren, Torrance, CA (US); Niccolo von Bueren, Rolling Hills Estates, CA (US); Xuan S. Bui, Torrance, CA (US)

(73) Assignee: SAKURA FINETEK U.S.A., INC., Torrance, CA (US)

( * ) Notice: Subject to any disclaimer, the term of this patent is extended or adjusted under 35 U.S.C. 154(b) by 362 days.

(21) Appl. No.: 16/370,879

(22) Filed: Mar. 29, 2019

(65) Prior Publication Data

US 2020/0309800 A1    Oct. 1, 2020

(51) Int. Cl.
  *G01N 35/00*   (2006.01)
  *G01N 35/04*   (2006.01)

(52) U.S. Cl.
  CPC .  *G01N 35/00732* (2013.01); *G01N 35/00029* (2013.01); *G01N 35/04* (2013.01); *G01N 2035/00801* (2013.01)

(58) Field of Classification Search
  None
  See application file for complete search history.

(56) References Cited

U.S. PATENT DOCUMENTS

| | | | |
|---|---|---|---|
| 4,116,775 A | 9/1978 | Charles et al. | |
| 4,118,280 A | 10/1978 | Charles et al. | |
| 4,248,498 A | 2/1981 | Georges | |
| 4,319,542 A | 3/1982 | Ojima et al. | |
| 5,573,727 A * | 11/1996 | Keefe | G01N 1/312 |
| | | | 118/423 |
| 5,975,349 A | 11/1999 | Menes | |
| 7,133,543 B2 | 11/2006 | Verwoerd et al. | |

(Continued)

FOREIGN PATENT DOCUMENTS

| | | |
|---|---|---|
| CA | 2808105 C | 12/2018 |
| CN | 103140789 A | 6/2013 |

(Continued)

OTHER PUBLICATIONS

Sakura Finetek U.S.A., Inc., Related Application, European Patent Application No. 19187543.4, European Search Report, dated Jan. 16, 2020.

(Continued)

*Primary Examiner* — Daniel S Larkin
(74) *Attorney, Agent, or Firm* — William Thomas Babbitt, Esq.

(57) ABSTRACT

An apparatus including a receptacle including a slot for receiving a basket; a push bar disposed in the receptacle, the push bar having an end to contact an edge of a single slide of a plurality of slides in a basket, the push bar including a first position below a bottom surface of a base of a basket that is received in the slot and a second position in the slot; and a sensor focused in a direction of the slot operable to acquire information from a slide in a received basket. A method including placing a slide basket into a slot of a receptacle; individually raising one or more slides from a respective position in the basket; using a sensor, acquiring information from the raised slide in the basket; and after acquiring information, lowering the raised slide.

22 Claims, 9 Drawing Sheets

(56) References Cited

U.S. PATENT DOCUMENTS

| | | |
|---|---|---|
| 7,457,481 B2 | 11/2008 | de la Torre-Bueno et al. |
| 7,867,442 B2 | 1/2011 | Graupner et al. |
| 8,283,176 B2 | 10/2012 | Bland et al. |
| 8,315,445 B2 | 11/2012 | Sorenson et al. |
| 8,722,412 B2 | 5/2014 | Egle et al. |
| 8,797,396 B2 | 8/2014 | Dietz et al. |
| 8,969,087 B2 | 3/2015 | Bland et al. |
| 9,122,905 B2 | 9/2015 | Soenksen et al. |
| 9,285,380 B2 | 3/2016 | Kasai et al. |
| 9,384,192 B2 | 7/2016 | Wrenn et al. |
| 9,519,847 B2 | 12/2016 | Pedrazzini |
| 2012/0128451 A1* | 5/2012 | Hagen .............. G01N 35/04 414/222.02 |
| 2012/0171003 A1 | 7/2012 | Egel et al. |
| 2014/0068442 A1 | 3/2014 | Eichhorn et al. |
| 2016/0187236 A1 | 6/2016 | Berberich et al. |
| 2016/0188937 A1 | 6/2016 | Tyrrell et al. |
| 2016/0210486 A1 | 7/2016 | Porreca et al. |
| 2017/0030938 A1* | 2/2017 | She ..................... G01N 35/04 |
| 2019/0166272 A1* | 5/2019 | Newberg ............. G02B 21/34 |
| 2019/0170777 A1* | 6/2019 | Newberg ............. G01N 35/025 |

FOREIGN PATENT DOCUMENTS

| | | |
|---|---|---|
| EP | 1447699 A2 | 8/2004 |
| EP | 2051051 A2 | 4/2009 |
| JP | 2008139063 A | 6/2008 |
| JP | 2016502107 A | 1/2016 |
| JP | 2017524916 A | 8/2017 |
| JP | 6205029 B1 | 9/2017 |
| JP | 2018025512 A | 2/2018 |
| WO | 200154052 A1 | 7/2001 |
| WO | 2012024627 A1 | 2/2012 |
| WO | 2016016814 A1 | 2/2016 |
| WO | 2018215814 A1 | 11/2018 |
| WO | 2019091598 A1 | 5/2019 |

OTHER PUBLICATIONS

Sakura Finetek U.S.A., Inc., Related Application, Japanese Patent Application No. P2019-157251, Notice of Allowance, dated Sep. 29, 2020.

Sakura Finetek U.S.A., Inc., Related Application, Australian Patent Application No. 2019240560, Examination Report No. 1, dated Jul. 10, 2020.

Sakura Finetek U.S.A., Inc., Related Application, Canadian Patent Application No. 3,049,232 Examiner's Report, dated Nov. 13, 2020.

Sakura Finetek U.S.A., Inc., Related Application, European Patent Application No. 19187543.4, Communication pursuant to Rules 70(2) and 70a(2) EPC and reference to Rule 39(1) EPC, dated Oct. 5, 2020.

Sakura Finetek U.S.A., Inc., Related Application, Canadian Patent Application No. 3,049,232 Examiner's Report, dated Jul. 9, 2021.

* cited by examiner

SLIDE IDENTIFICATION SENSOR

TECHNICAL FIELD

Tissue slide sensor.

BACKGROUND

In various settings, examination of biological specimens is required for diagnostic purposes. Generally speaking, pathologists and other diagnosticians collect and study samples from patients, and utilize microscopic examination, and other devices to assess the samples at cellular levels. Numerous steps typically are involved in pathology and other diagnostic process, including the collection of biological samples such as blood and tissue, processing the samples, preparation of microscope slides, staining, examination, re-testing or re-staining, collecting additional samples, re-examination of the samples, and ultimately the offering of diagnostic findings. Numerous medical or veterinary personnel may be involved in the diagnostic processes, including surgeons, phlebotomists or other operating personnel collecting samples, pathologist, histologists and other personnel processing, transporting and examining the samples and so on. The complexity of the tissue handling procedures from the operating room to the laboratory and back to the diagnosticians or surgeons have become increasingly complex in large medical environments where high volumes of samples need to be handled, processed and examined on a daily basis.

Various steps of the tissue handling procedures have been automated using instruments each of which typically are controlled by a dedicated computer or an on-board computerized controller. In some laboratories, information can be shared between automated instruments and/or a networked laboratory or hospital information system, such as to store patient or tracking data. One example of an automated instrument is an automated tissue processing system in which biological samples are fixed and infiltrated with paraffin in an automated fashion. Exemplary tissue processing systems are the TISSUE-TEK VIP® and the TISSUE-TEK XPRESS® processing systems available from Sakura Finetek USA, Inc. of Torrance, Calif. Another example of automation is an automated slide stainer and coverslipper, which stains microscope slides and applies coverslips to the slides in an automated fashion. Examples of such automated staining and coverslipping systems are TISSUE-TEK PRISMA® and TISSUE-TEK® FILM™ combo system and TISSUE-TEK PRISMA® and TISSUE-TEK® Glas™ g2 combo system available from Sakura Finetek USA, Inc. of Torrance, Calif.

To maximize laboratory efficiency and patient safety, specimens are often labeled with some form of readable information that may convey patient information and/or specimen processing requirements. Machine readable bar coding is one type of readable information that facilitates many laboratory practices, including specimen tracking, automation, and quality management.

BRIEF DESCRIPTION OF THE DRAWINGS

These and other features, aspects and advantages of the present invention will become better understood with regard to the following description, appended claims, and accompanying drawings where:

DETAILED DESCRIPTION

A device or apparatus for sensing a specimen slide. Sensing in this context includes, but is not limited to, imaging (capturing a digital image) and/or reading information printed on or otherwise written on the slide, such as on the frosted area on a front or the back of the frosted area of a slide or on a label affixed to an area of a slide. A device is capable of sensing a presence and information on individual slides that may be loaded into a slide basket with one or more slides (e.g., 10 slides. 20 slides, etc.). In one embodiment, the apparatus or device includes a receptacle including a slot for receiving a specimen slide basket operable for containing a number of specimen slides therein; a push bar disposed in the receptacle and having an end to contact an edge of a single slide in the basket wherein the push bar includes a first position below a bottom surface of a base of a slide basket that is received in the slot and a second position or second positions in the slot. The apparatus or device also includes a sensor (e.g., at least one sensor) such as a camera or bar code reader or other device reader focused in a direction of the slot and operable to acquire information from a slide in a received basket. A method of acquiring information on a slide is also disclosed. In one embodiment, the method includes placing a slide basket including one or more slides into a slot of a receptacle; individually raising the one or more slides from a respective position in the basket; acquiring information from the raised slide in the basket using a sensor; and after acquiring information, lowering the raised slide.

Figure 1:
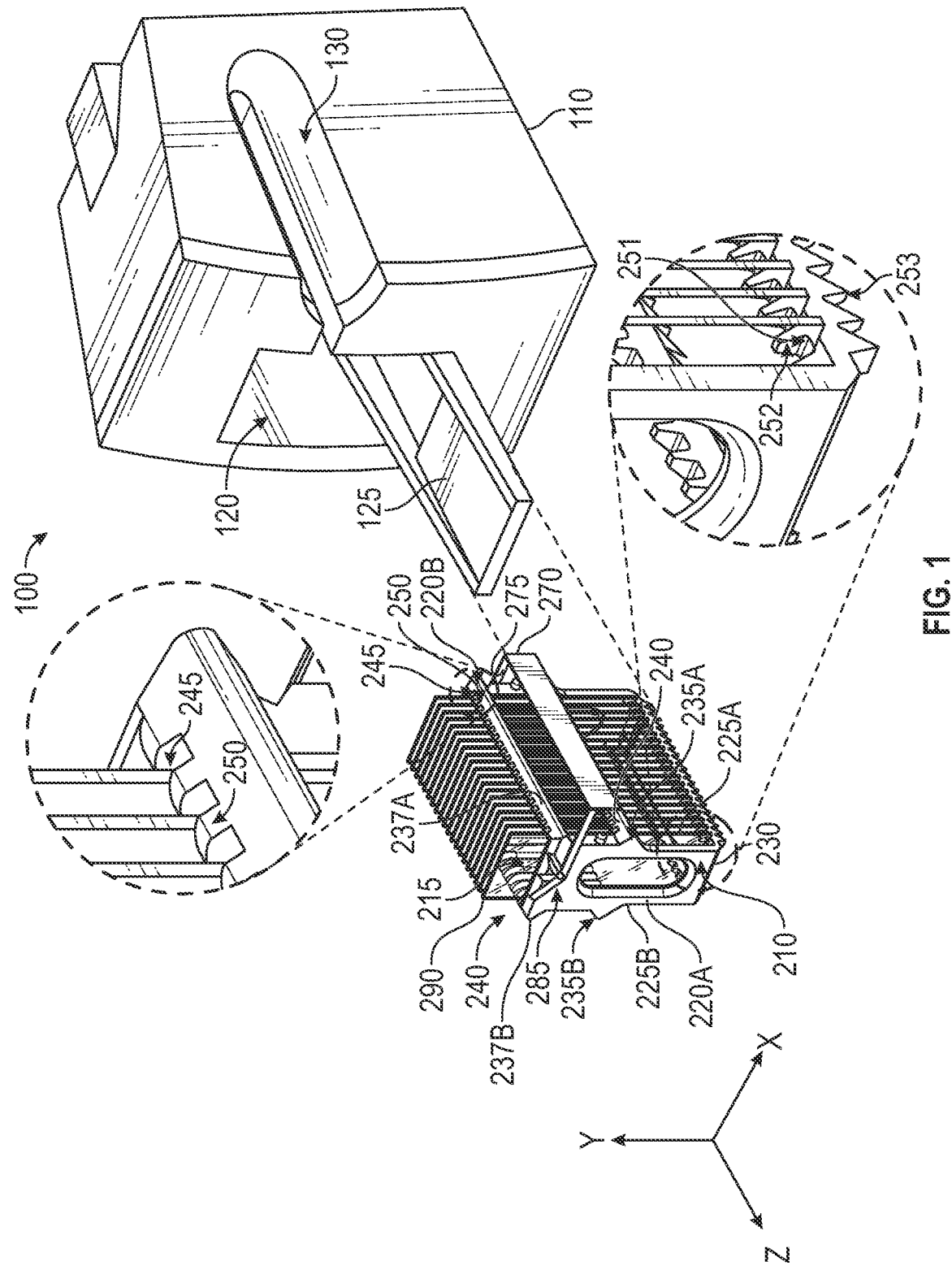
FIG. 1 shows a top side perspective view of an embodiment of an apparatus for sensing individual slides and a basket of slides operable to fit within a slot in the apparatus.

FIG. 1 shows an embodiment of an apparatus for sensing a specimen slide. Apparatus 100 includes receptacle or housing 110 which, in this embodiment, is represented by a stand-alone unit that is suitable to be placed on a table top or workbench at a location such as near a slide stainer such as the TISSUE-TEK PRISMA® PLUS slide stainer. Disposed in receptacle 110 is slot 120 having dimensions operable to receive a slide basket therein. Receptacle 110 also includes a sensor (e.g., at least one sensor) therein to sense, read or capture an image of or acquire information from a slide or each of the slides in a basket.

FIG. 1 also shows a representative slide basket operable to hold a number of slides. A specimen or microscope slide is generally a thin flat piece of glass typically 75 millimeters long by 26 millimeters wide (e.g., 3 inches long by 1 inch wide) and of about one millimeter thickness. In this representative embodiment, slide basket 210 is a 10-slide or 20-slide TISSUE-TEK PRISMA® slide basket commercially available from Sakura Finetek USA, Inc. In this embodiment, slide basket 210 includes opposing sidewalls 220A and 220B defining a length dimension of the basket and opposing sidewalls 225A and 225B defining a width dimension of the basket. Slide basket 210 also includes base 230 to which all the sidewalls are connected. Opposing sidewalls 220A, 220B, 225A and 225B and base 230 collectively define a interior volume of the slide basket into which slides may be positioned vertically lengthwise therein (a standing position). In one embodiment, the dimension (e.g., lateral dimension) between sidewall 225A and sidewall 225B is sufficient to accommodate the width of a slide therein (e.g., 25 mm (one inch)) with little excess side spacing. Sidewall 225A and sidewall 225B are defined, in one embodiment, by opposing sidewall supports 235A and 235B above or at or near a midpoint of a height basket 210 and opposing sidewall supports 237A and 237B at top 240 of basket 210. In one embodiment, each of opposing sidewall supports 235A-235B and opposing sidewall supports 237A-237B have a pattern of a teeth and notches along their length (z-dimension) with the teeth and notches aligned on each side. FIG. 1 shows basket 210 including notch 245 and teeth 250 in opposing sidewall support 237A (see inset). Similar teeth and notches are disposed in supports 235A, 235B and 237B. Base 230 of the slide basket 210 includes opposing shelves 251 along a length dimension (z-dimension) with each shelf 251 having a width or x-dimension of up to a few millimeters on which a slide can contact when the slide is positioned in slide basket 210. Each shelf 251 also includes a number of teeth 252 aligned with teeth 250 in sidewall supports 235A, 235B, 251A and 237B and projecting in a y-dimension upward into the interior volume of slide basket 210. Teeth 252 may serve to keep multiple slides 290 contained in a slide basket separated at a base of slide basket 210. Shelf 251 also includes teeth 253 on a side opposite an interior volume of slide basket 210 and teeth 252. As described below, teeth 253 are utilized to interact with a track to move slide basket 210 into and out of apparatus 100. In this embodiment, teeth 253 have a triangular shape with an apex extending away from an interior volume of slide basket 210. The triangular shape of teeth 253 provides relatively an easy snap in and release of basket 210 to a track of apparatus 100.

In one embodiment, volume 215 of basket 210 has an x-dimension width suitable to contain a slide therein such that the slide will fit within notch 245 and is separated and held in z-direction by teeth 250 on either side. In this manner, multiple slides 290 may be positioned in slide basket 210 in a length direction (length direction from base 230 of basket 210 to top 240) without contacting with one another. Each slide 290 is stacked vertically (y-axis) relative to a length dimension of the slide so that in FIG. 1 one end of each slide is protruding from top 240 slide basket 210. In this embodiment, slides have a length dimension that is greater than a height of slide basket 210. Slide basket 210 is open at top 240 to allow slides to extend beyond top 240 of slide basket 210.

Still referring to basket 210 of FIG. 1, in this embodiment, basket 210 also includes handle 270 supported by arras 275 that are respectively connected to front wall 220A and back wall 220B. In this embodiment, arms 275 are connected through a pivot plate to front wall 220A and back wall 220B of slide basket 210 such that they may swing in a circular direction from above the basket to 90 degrees to a side as illustrated. In one embodiment, front wall 220A and back wall 220B, each include shoulder protrusion 285 of a thickness sufficient to stop the rotation of arms 275. In a clockwise direction, shoulder protrusion 285 stops the arms at approximately 90 degrees and in a counterclockwise direction, shoulder protrusion 285 stops the arms in approximately 45 degrees rotation, Referring again to apparatus or device 100, in one embodiment, receptacle 110 includes side opening 130 positioned to accommodate arms 275 therethrough when basket 210 is received in receptacle 110.

In one embodiment, basket 210 is intended to be seated by hand or machine on shelf 125 of receptacle 110. Shelf 125 includes a track therein to automatically move basket 210 into and out of slot 120 of receptacle 110. When seated on shelf 125, handle 270 of basket 210 is positioned at a side of basket 210 so that, arms 275 and handle 270 can be positioned in opening 130 on a slide of receptacle 110.

Figure 2:
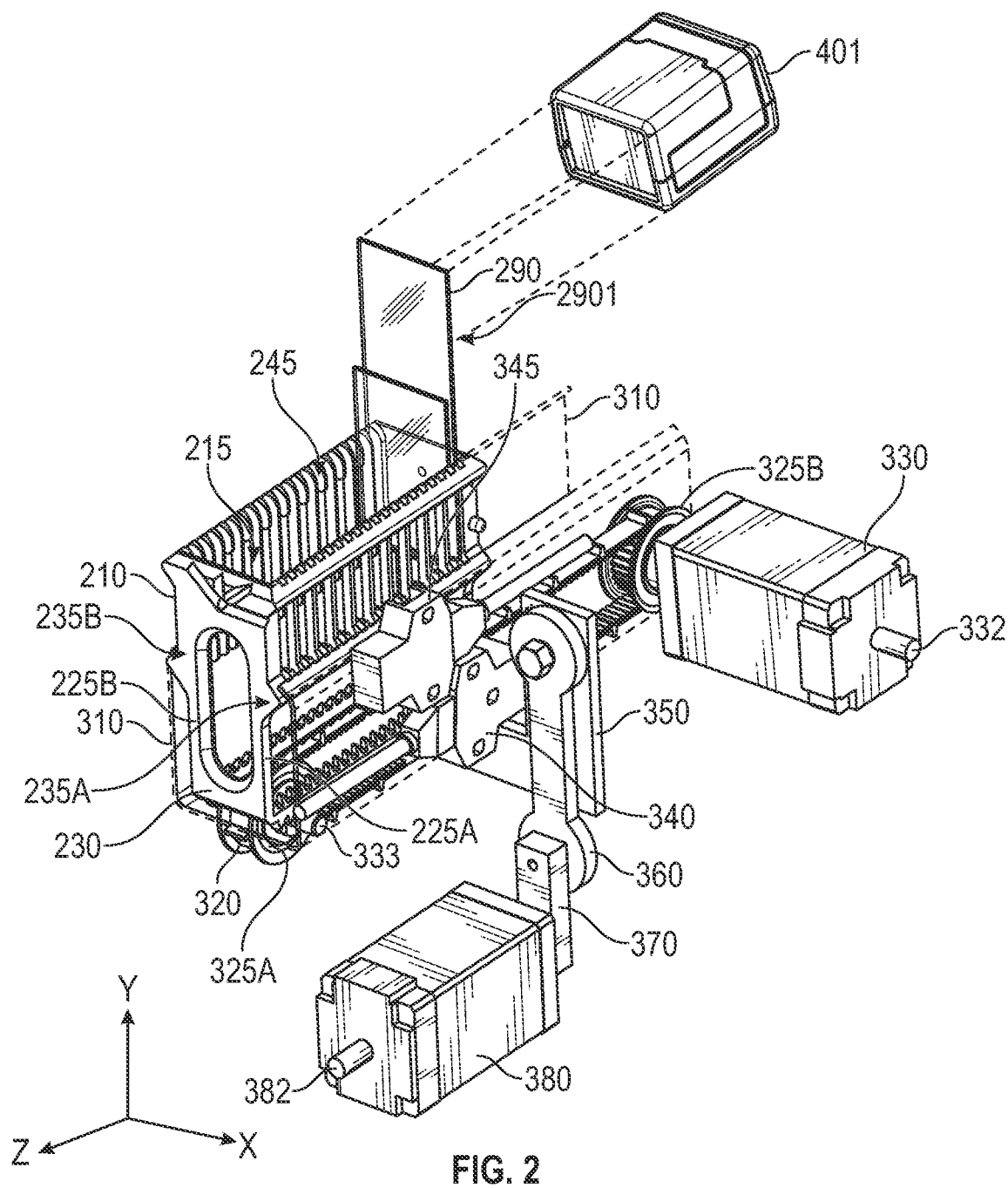
FIG. 2 shows a top side perspective view of the apparatus of FIG. 1 with the basket of slides within the slot of the apparatus, the receptacle housing, the shelf and a base of the apparatus and the handle of the basket removed, and wherein one slide in the basket is raised relative to other slides.

FIG. 2 shows a top side perspective view of an embodiment of imaging apparatus 100 with receptacle 110 and shelf 125 removed and basket 210 disposed in receptacle 110 with handle 270 of basket 210 removed. Referring to FIG. 2, in this embodiment, inside receptacle 110 through slot 120 is tray 310 shown in dashed lines. In this embodiment, tray 310 includes opposing side walls connected to a base that is positioned under shelf 125 within receptacle 110. Tray 310 representatively is a relatively thin aluminum material. The sidewalls of tray 310 project perpendicularly from its base and are spaced to accommodate basket 210. Basket 210 includes sidewall support 235A and sidewall support 235B on opposite sides thereof. In one embodiment, sidewall supports 235A and 235B are arrow shaped with a tip of the arrow pointed outward (away from basket 210). In this manner, in one embodiment, the sidewalls of tray 310 have a shape to accommodate a shape of sidewall supports 235A and 235B so that basket 210 fits within tray 310.

In one embodiment, the base of tray 310 has an opening through much of its length. Disposed within the opening is belt or track 320 such as a plastic belt. In one embodiment, belt 320 is disposed on roller 325A and roller 325B. Rollers 325A and 325B are separated in one embodiment by a distance of approximately a length of tray 310. In one embodiment, each of roller 325A and roller 325B has a number of equally spaced teeth defining their circumference. One side of belt 320 (the side facing rollers 325A and 325B) has similar spaced teeth operable to mate with the teeth on a roller. In one embodiment, the spacing of the teeth on the roller and belt 320 is similar to the spacing between notches 245 in basket 210 such that the belt can stop basket 210 notch 245-by-notch 245 into or out of slot 120. In one embodiment, roller 325B is connected to motor 330 by way of a rod or axle 332. In one embodiment, motor 330 is an electrically powered step motor operable to rotate roller 325B. Roller 325A is disposed on axle 333 and is rotatable thereon.

FIG. 2 also shows a motorized assembly for lifting the individual slides in basket 210. Apparatus includes, in this embodiment, U-shaped push bar 350 with one end of a vertical projection of push bar 350 being positioned to move vertically within an opening of a base of tray 310 and through an opening and in base 230 of basket 210. The other vertical projection of push bar 350 is positioned outside of tray 310. Connecting rod 360 is connected to push bar 350 at one end and at a second end to L-shape rotating arm 370. Rotating arm 370 is connected to motor 380 through rod 382. In one embodiment, motor 380 is an electrically operated motor operable to rotate rod 382. A rotation of rod 382 rotates rotating arm 370. Rotating arm 370 is pivotably connected to connecting rod 360 and a rotation of rotating arm 370 moves connecting rod 360 up and down. The up and down movements of connecting rod 360 are transferred to push bar 350 which itself moves up and down with rotation of motor 380. The upward movement advances the vertical arm of push bar 350 into and out of basket 210 (into and out of a base of the basket) to lift an individual slide (slide 290) in basket 210 vertically (a Y-direction) relative to a position where one end of the slide is seated at a base of basket 210. Upon lifting an individual slide (slide 290) from basket 210, an area 2901 of the slide is exposed and may be sensed (e.g., imaged) by sensor 401. Where multiple sensing of slide information is desired such as wherein there are two bar codes on a slide label or in a slide label area and each code is to be sensed, motor 380 may advance the vertical arm of push bar 350 to a first vertical position so that a first bar code may be sensed by sensor 401 and then advance the vertical arm of push bar 350 to a second vertical position so that a second bar code may be sensed by sensor 401. The two bar codes on a slide label or a slide label area in this example may be positioned such that the first bar code is closest to an end of the slide (a top end as viewed) and the second bar code is below the first bar code. Advancing the vertical arm of push bar 350 to a first and second vertical position may place the first and second bar code in the line of sight of sensor 401.

Figure 3:
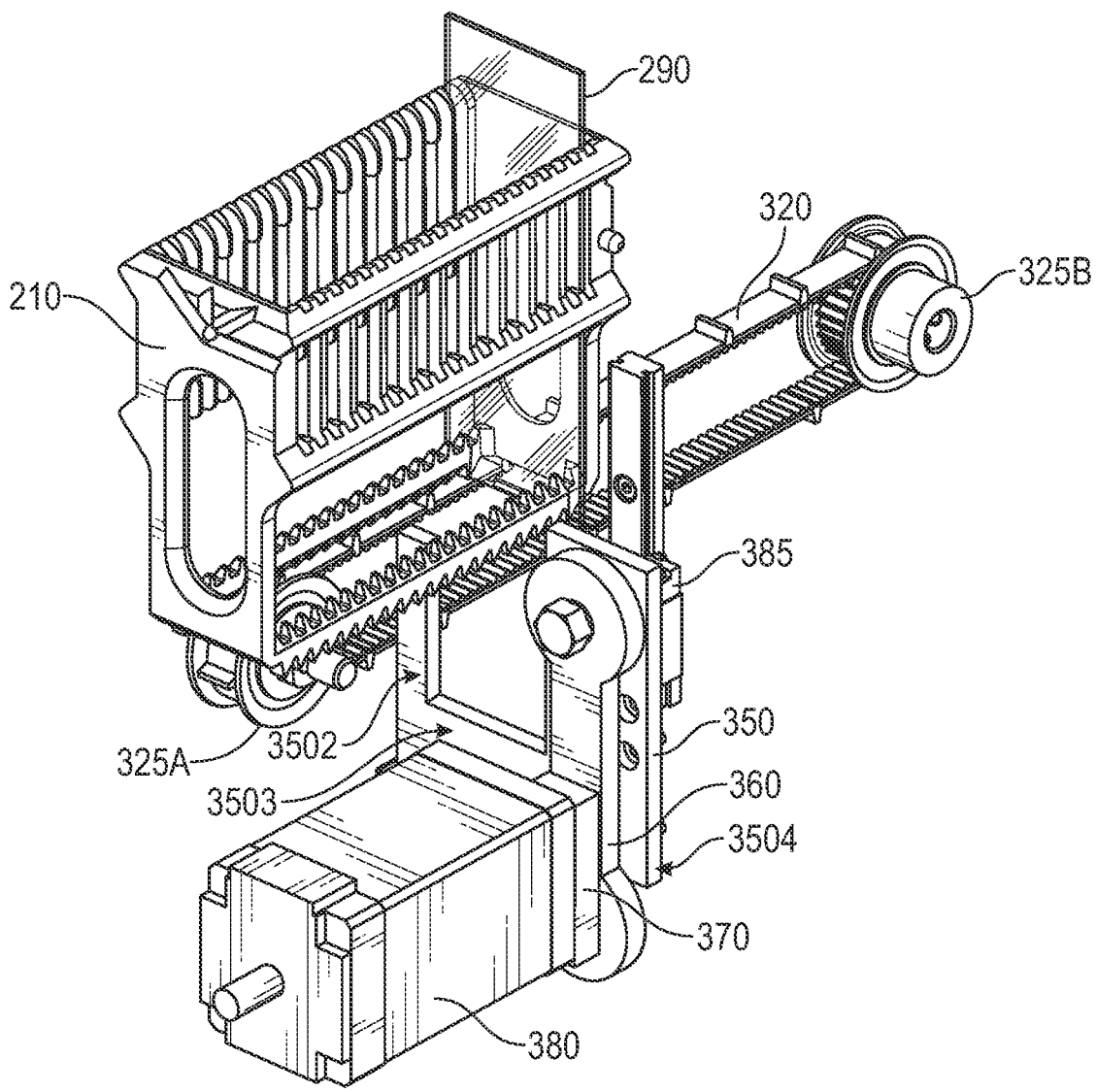
FIG. 3 shows a top side perspective view of the apparatus of FIG. 1 with the basket within the slot of the apparatus, the receptacle housing, the shelf, the tray, the motor to rotate rollers and a base of the apparatus removed and shows a slide seated in the basket in a non-raised position.
Figure 4:
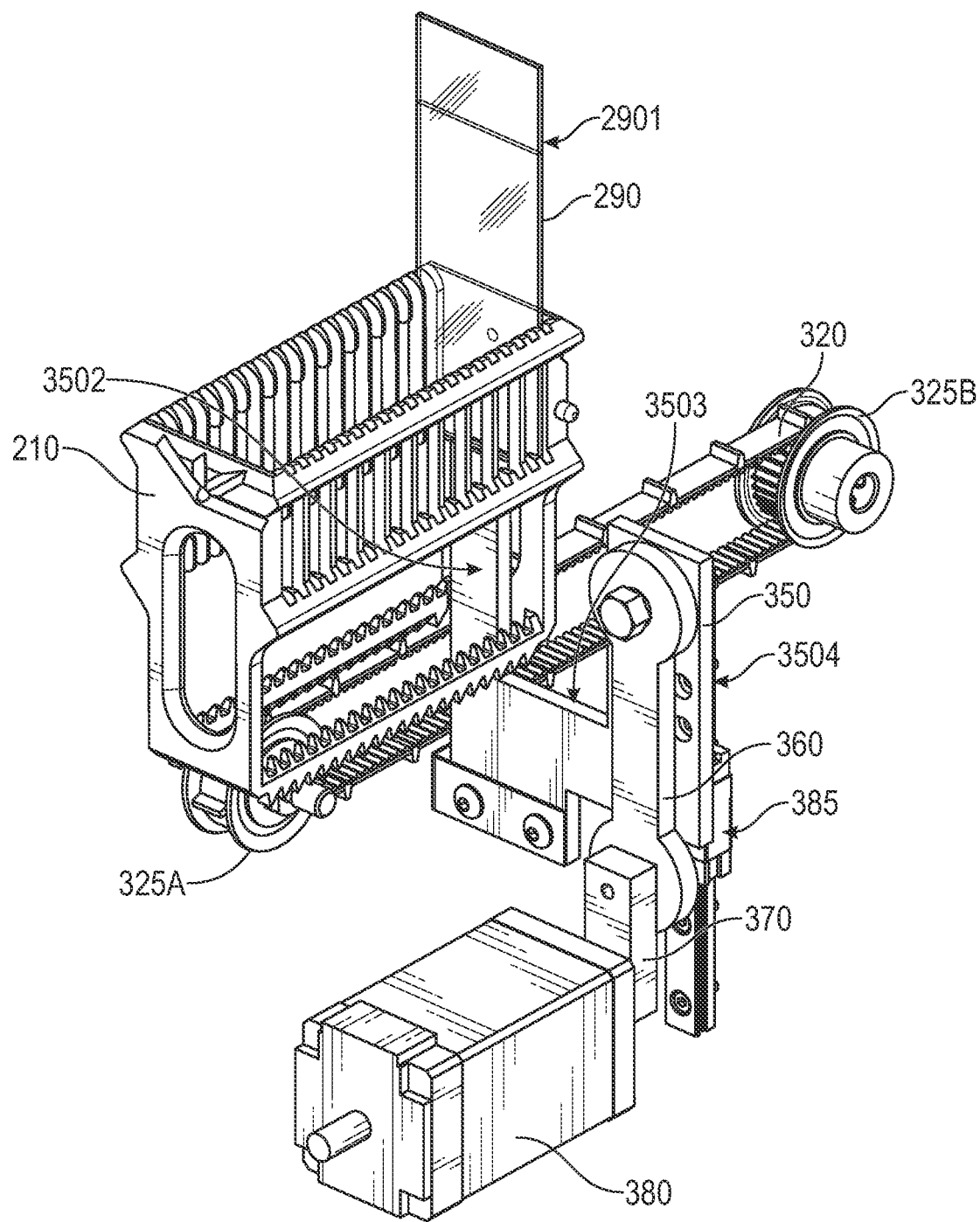
FIG. 4 shows a top side perspective view of the apparatus of FIG. 1 with the basket within the slot of the apparatus, the receptacle housing, the shelf, the tray, the motor to rotate rollers and a base of the apparatus removed and shows a slide in the basket in a raised position.

FIG. 3 and FIG. 4 show top side perspective views of apparatus 100 with receptacle 110, tray 310 and motor 330 removed and shows the lifting and return of slide 290 in basket 210. Referring to FIG. 3 and FIG. 4, the figures show push bar 350 including vertical projection 3502 and vertical projection 3504 and separated by lateral projection 3503. In this embodiment, vertical projection 3502 of push bar 350 has a width that can be accommodated within basket 210 (e.g., through an opening in base 230 of basket 210) and a thickness approximately equivalent to a thickness of slide 290 and no thicker than a width of notch 245. FIG. 3 shows vertical portion 3502 of push bar 350 beneath basket 210 (beneath base 230 of basket 210) and slide 290 resting in a slot at base 230 of basket 210. In FIG. 3, rotating arm 370 is in a down position. FIG. 4 shows rotating arm 370 in an up position. By moving rotating arm 370 from a down to an up position, connecting rod 360 lifts push bar 350 upward a representative distance on the order of 12 mm to 25 mm (0.5 inches to 1 inch). As push bar 350 is lifted, portion 3502 of push bar 350 enters basket 210 and pushes against, an end of slide 290 and pushes slide 290 upward so that an end of slide 290 is no longer adjacent to or in contact with base 230 of basket 210. The vertical movement of push bar 350 is guided by linear guide 385. Slide 290 is in an up position with a greater length portion outside of basket 210 relative to other slides that might be nested in basket 210. Portion 2901 of the slide may be sensed (imaged) by a sensor as described above.

Figure 5:
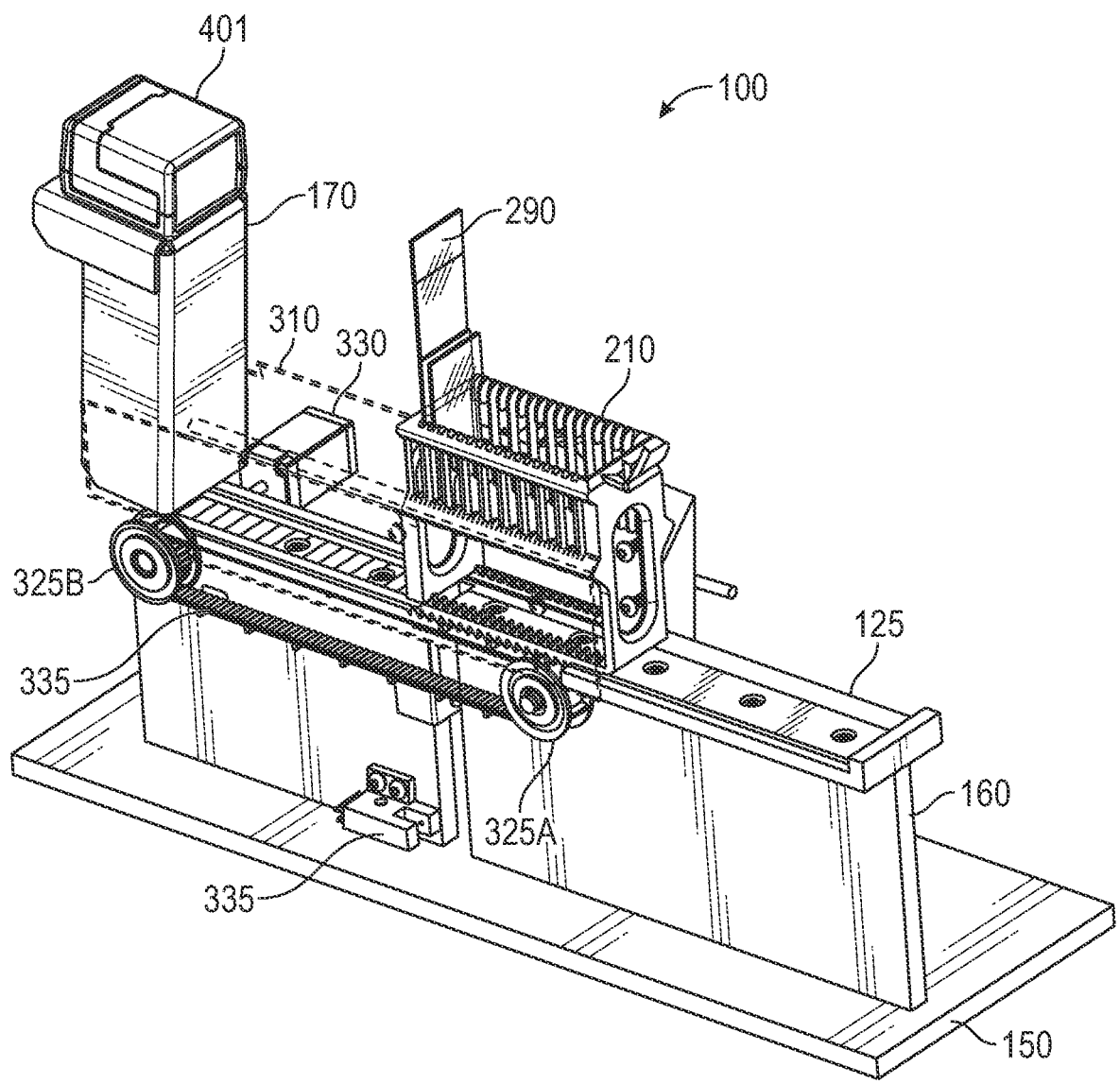
FIG. 5 shows a top first side perspective view of the apparatus of FIG. 1 with the receptacle housing removed.
Figure 6:
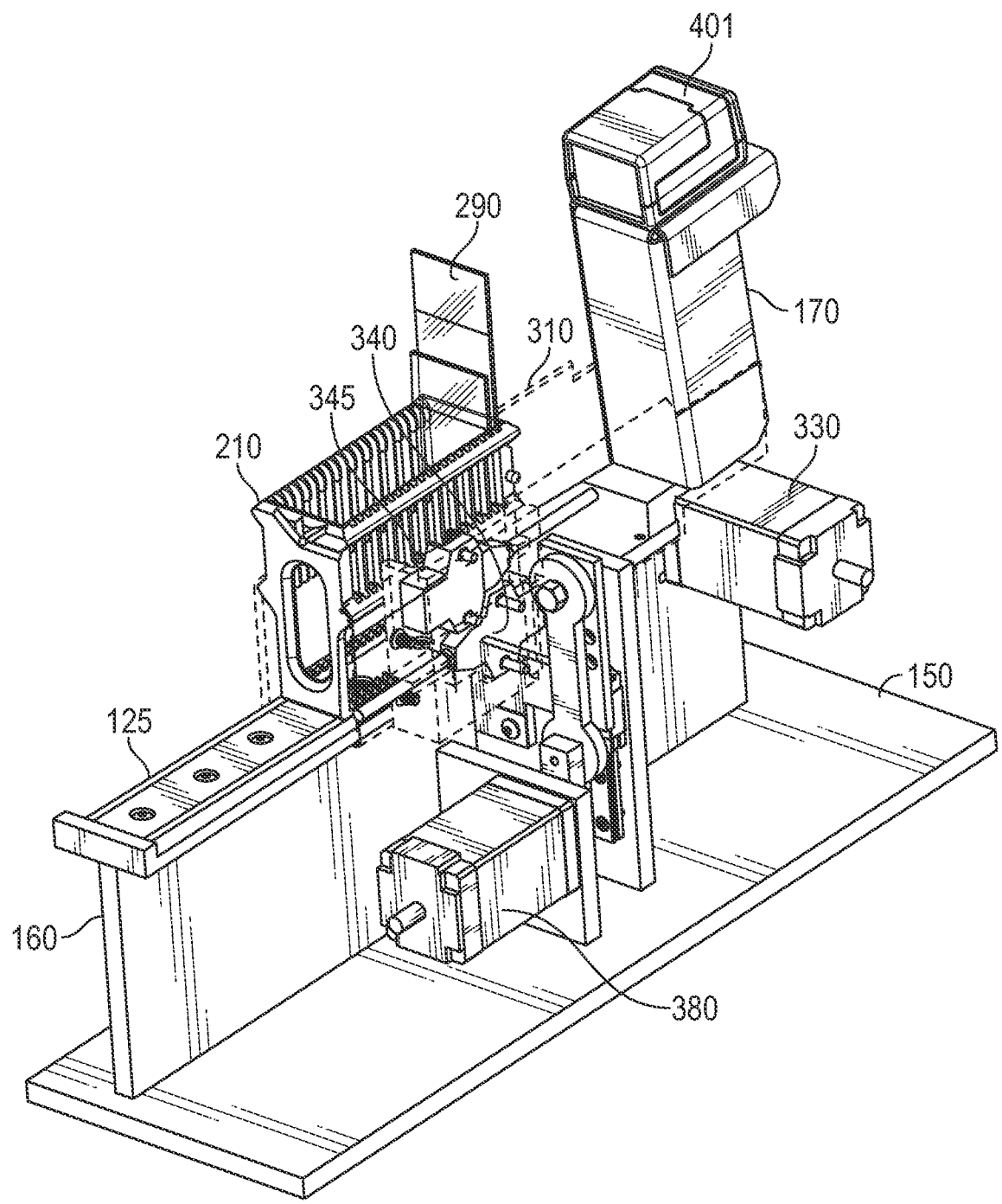
FIG. 6 shows a top second side perspective view of the apparatus of FIG. 1 with the receptacle housing removed.

FIG. 5 and FIG. 6 show opposite side views of apparatus 100 with housing 110 removed. In this embodiment, a bottom or base of apparatus includes base 150 that is representatively shown having a rectangular plate shape. Projecting perpendicularly from base 150 is support 160 that, in this embodiment, also has a rectangular plate shape. Disposed on support 160 is track 125 and tray 310 (shown in dashed lines). Projecting from support 160 above tray 310 at one end of tray 310 is pedestal 170. Sensor 401 is mounted on pedestal 170. FIGS. 5 and 6 also show a number of detection sensors within apparatus 100. FIG. 5 shows detection sensor 335 mounted on base 150 and support 160. In one embodiment, detection sensor 335 is a photoelectric sensor that senses a vertical position of push bar 350 such as by projecting a beam at the push bar at the lowest position. When push bar 350 is moved vertically, the beam no longer is projected at the push bar and the sensor detects or senses such change. FIG. 5 and FIG. 6 further show sensor 401 such as a bar code reader or a camera (e.g., a charge coupled device (ccd) camera) adapted to acquire information (e.g., adapted to read and/or capture an image) from a raised slide. A second sensor that may be the same type or a different type than sensor 401 (e.g., bar code reader, camera, etc.) may also be present, for example, positioned above or below sensor 401 in a stacked arrangement to provide additional sensing of each slide. The additional sensor to sensor 401 may be utilized to sense a separate bar code than sensor 401 in a situation where there are multiple bar codes on a slide label or in a slide label area. Alternatively, sensor 401 may be utilized to sense a bar code on a slide and the additional sensor to sensor 401 may be utilized to capture an image of a slide label.

FIG. 6 shows detection sensor 340 that in one embodiment is a photoelectric sensor that detects the position of basket 210 by emitting a light, horizontally through an opening in tray 310. Detection sensor 340 is operable to detect a basket position in tray 310 as well as the presence of a slide in basket 210. In one embodiment, mounted on or adjacent to detection sensor 340 is detection sensor 345. Detection sensor 345, in one embodiment, is a photoelectric sensor that projects a light horizontally through an opening in tray 310 to indicate the presence of a basket. Detection sensor 345 serves, in one aspect, to detect the presence of a basket and a size (e.g., length) of the basket. In an embodiment, where apparatus is operable to accommodate baskets of different sizes (e.g., 10-slide basket, 20-slide basket), detection sensor 345 is utilized to detect the type of basket. Detection sensor 345 may be used to start an operation of apparatus 100 when detection sensor 345 detects the presence of a basket. Start an operation may include signaling to motor 330 to energize and rotate roller 325B to move basket 210 (see FIG. 5). Apparatus 100 may include a processor or controller therein operable to or configured to receive or gather signals from detection sensors (detection sensor 335, detection sensor 345) and direct the operation of motors (motor 330, motor 380) and operation of sensor 401.

Figure 7:
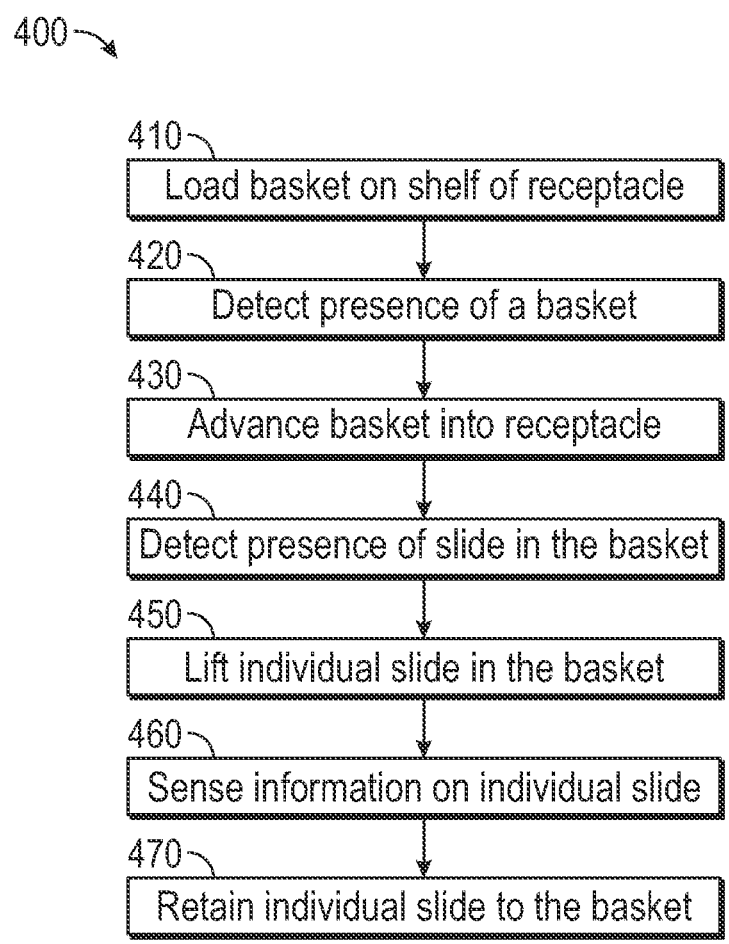
FIG. 7 presents a flow chart of an operation of sensing individual slides in a basket of slides with a stand alone sensor/reader according to one embodiment.

FIG. 7 presents a flow chart of an embodiment of a method of operation of apparatus 100. Method 400 begins or may begin after loading a slide basket containing one or more slides into the apparatus by, for example, placing the slide basket on shelf 125 (block 410). If the basket has a handle such as handle 270 (see FIG. 1), the handle can be aligned or removed so that the slide basket will fit in the apparatus. In one embodiment, handle 270 of basket 210 is rotated 90 degrees from an overhead position so that when basket 210 is advanced into receptacle or opening 120 of apparatus 100, handle 270 will protrude outside of the apparatus through opening 130.

Once a basket is placed on shelf 125 of apparatus 100 so that it is over a portion of belt 320, belt 320 engages teeth at the base of the basket (teeth 250) and detection sensor 345 detects the presence of the basket (block 420). Belt 320 may then be advanced by motor 330 either automatically (e.g., in response to detection sensor 345 sending a signal to motor 330) and basket 210 is advanced into receptacle slot 120 of receptacle 110 (block 430). As basket 210 is advanced into slot 120, detection sensor 340 detects the presence of a slide in basket 210 (block 440), motor 380 is activated and drives push bar 350 upward to lift a slide in basket 210 (block 450). Detection sensor 330 senses the advancement of push bar 350. A signal from detection sensor 330 to sensor 401 will alert to a raised slide, allowing sensor 401 to then sense information on the raised slide (e.g., read, image) (block 460). After sensing, the slide is lowered into basket 210 (block 470) and belt 320 is then advanced by motor 330 to advance basket 210 until detection sensor 340 detects another slide in basket 210. If a slide is detected the slide is raised and sensed.

In one embodiment, apparatus includes a processor or controller that coordinates the movement of motor 330 and motor 380. The processor or controller is operable to receive or retrieve signals from each of detection sensor 330, detection sensor 340 and detection sensor 345. The processor, in one embodiment, is hard wired or contains a memory with non-transitory machine-readable instructions therein that when executed cause push bar 350 to be raised and sensor 401 to detect (e.g., read, image) a slide raised by push bar 350. The executable instructions also include instructions to lower push bar 350 and then step motor 380 a distance to position push bar 350 under another slide position in basket 210. The executable instructions further include instructions to operate motor 330 to advance basket 210 into slot 120 and instructions to eject basket 210 from slot 120 when all slides in the basket are individually sensed by sensor 401.

In one embodiment, sensor 401 is connected to a laboratory information system (LIS) that is a software system that records, manages and stores data for clinical laboratories. Where sensor 401 is, for example, a bar code reader or scanner, sensor 401 is operable to read and optionally record a bar code that is printed on a slide (e.g., on a slide label or frosted area of the slide). This information may include but is not limited to patient data (name, admitting physician, ordering department, specimen type, etc.) and a staining or other protocol for the specimen on the slide (e.g. accessioning number). The information that is read by sensor 401 may be transmitted to the LIS to allow the system to track the slide and also subsequently perform any required staining protocol or other preparation protocol for the specimen. It is appreciated that a bar code reader or scanner is one example of a sensor that is operable to sense information from a slide. In another embodiment, sensor 401 may be a camera or other reader (e.g., radio frequency identification (RFID) reader).

Figure 8:
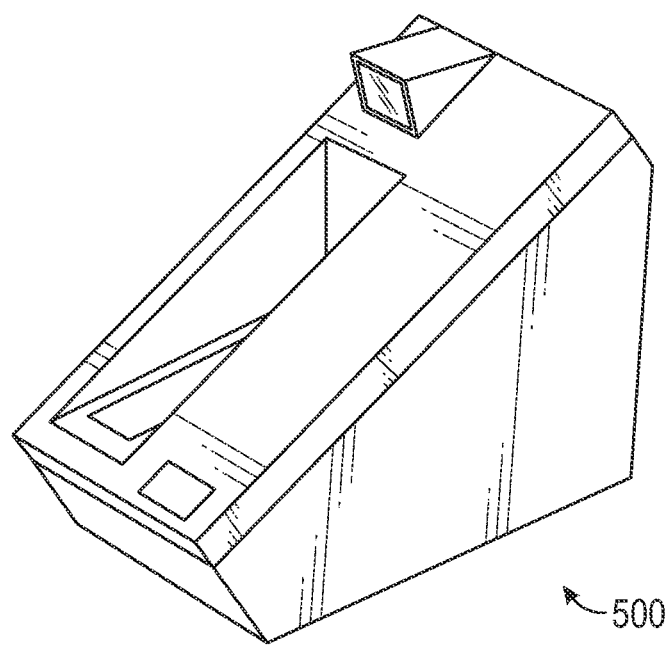
FIG. 8 shows a top side perspective view of another embodiment of a apt ara s for sensing individual slides within a slot in the apparatus.
Figure 9:
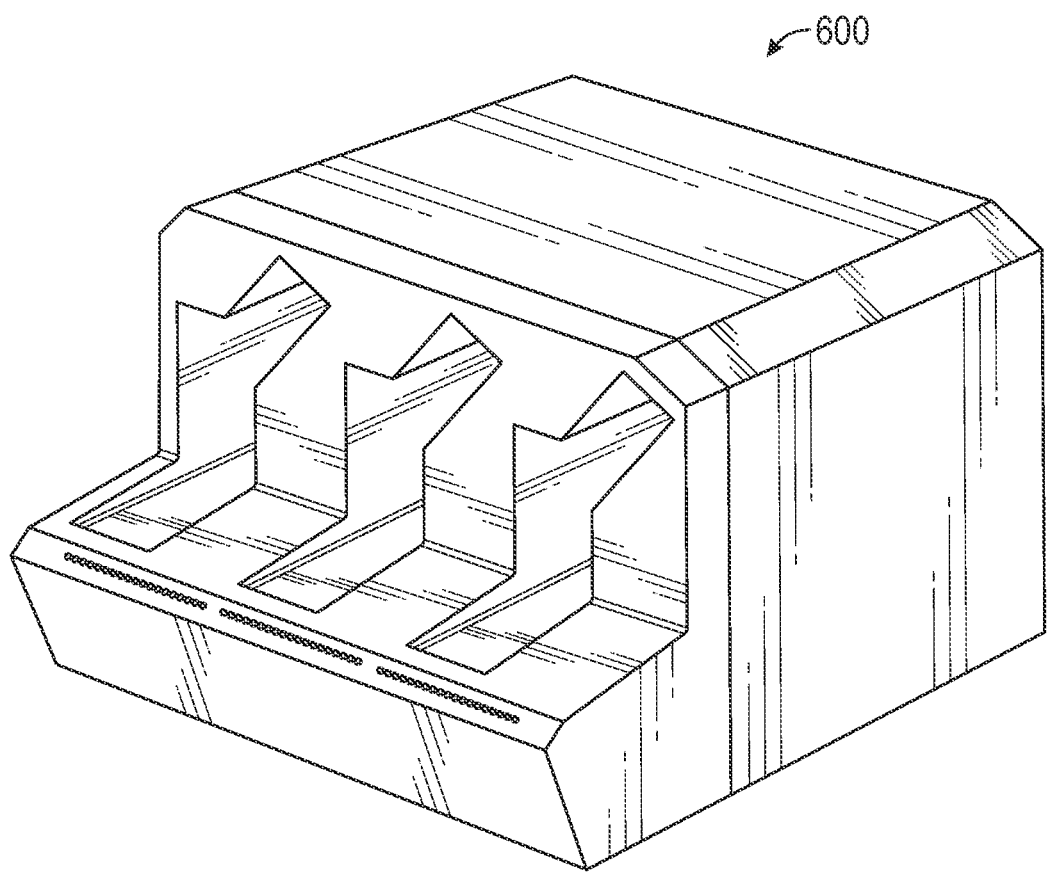
FIG. 9 shows a top side perspective view of another embodiment of an apparatus for sensing individual slides in multiple baskets.

In the above embodiment, an apparatus is disclosed that has the capacity to accommodate one basket in a slot that moves the basket within the receptacle of the apparatus. FIG. 8 shows another embodiment of an apparatus for sensing individual slides where the basket is exposed. Apparatus 500 also includes an exposed sensor to sense (e.g. image, read) information on a slide. In another embodiment, an apparatus has the capacity to accommodate multiple baskets. FIG. 9 shows an embodiment including capacity for three baskets, respectively. Apparatus 600 includes, in one embodiment, multiple tracks, belts motors, detection sensors and one or multipleslide sensing (e.g., reading, imaging) sensors.

Figure 10:
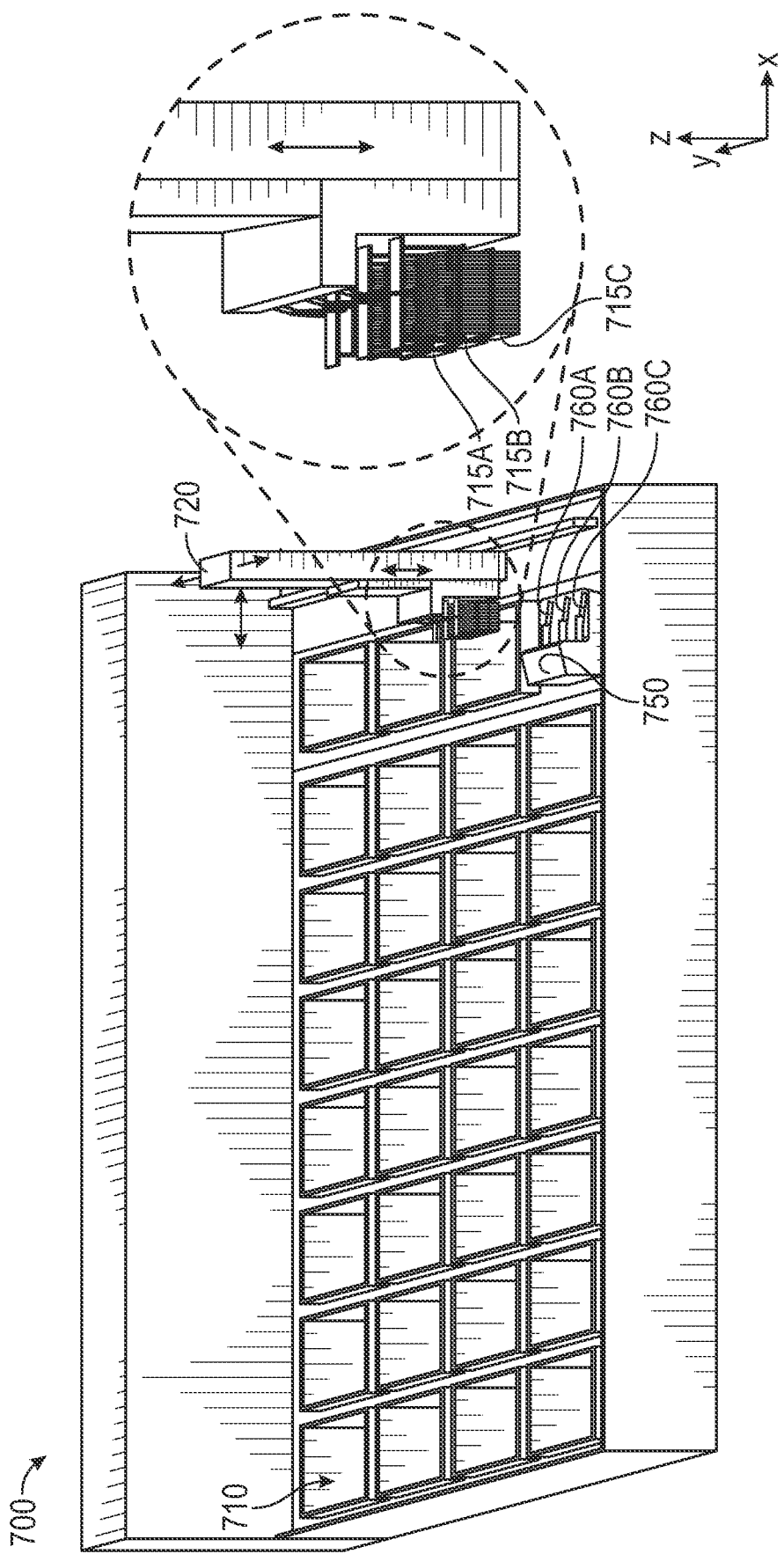
FIG. 10 shows a slide staining system or stainer including a slide identification apparatus therein.

In one embodiment, apparatus 100, apparatus 500 or apparatus 600 may function as an individual unit (a stand-alone unit) in a laboratory. In another embodiment, a slide identification or sensing apparatus may constitute a component or module of a multi-module system. One example is a slide identification or sensing apparatus as part of a slide staining system or stainer. FIG. 10 shows a representative example of a stainer that may be similar to a TISSUE-TEK PRISMA® stainer that may be part of a TISSUE-TEK PRISMA® and TISSUE-TEK® FILM™ combo system and TISSUE-TEK PRISMA® and TISSUE-TEK® Glas™ g2 combo system available from Sakura Finetek USA, Inc. of Torrance, Calif. Stainer 700 includes several reservoirs 710 each containing a particular reagent and robotic assembly 720 operable to transport one or more baskets of slides in x, y and z dimensions across the stainer and deposit and remove the one or more baskets from desired reservoirs 710. In an example, staining with hematoxylin and eosin ("H & E") is performed in stainer 700 so ones of reservoirs 710 may include hematoxylin and others eosin along with reservoirs containing for example formalin or other reagents including other stains. Stainer 700 also includes slide identification apparatus 750 disposed in stainer 700 in an area of the stainer accessible by robotic assembly 720. In this example, slide identification apparatus 750 may be similar to apparatus 600 in FIG. 9 and has three slots 760A, 760B and 760C in a receptacle or housing of the apparatus for accommodating respective baskets of slides. Within the housing of slide identification apparatus may be tracks, belts, motors, push bars and sensors including slide sensing (e.g., reading, imaging) sensors respectively associated with each of slot 760A, 760B and 760C. Robotic assembly is operable to grasp three baskets of slides (basket 715A, basket 715B and basket 715C) and transport the three baskets at one time. In one operation, once basket 715A, basket 715B and basket 715C are loaded in an area in stainer 700, the three baskets are grasped by their handles and transported by robotic assembly 720 to an area above slide identification apparatus 750. The baskets are then lowered by robotic assembly 720 into respective slots in slide identification apparatus 750 (e.g., basket 715A into slot 760A, basket 715B into slot 760B and basket 715C into slot 760C). The individual baskets are then released by robot assembly 720 and moved into slide identification apparatus 750. Slide information associated with each slide (e.g., printed, marked in a slide label area) in each basket may then be sensed (e.g., read, imaged). Following sensing of each slide in each basket, basket 715A, basket 715B and basket 715C are exposed in the slots for pick up by robotic assembly 720. Robotic assembly 720 may pick up the three baskets and transport the baskets to particular reservoirs 710 for staining. Although described as preceding slide staining, sensing of individual slides by slide identification apparatus 750 may be performed after the slides have been stained or in the case of a combination staining and coverslip system, after coverslipping.

FIG. 10 describes a staining system or stainer including a slide identification or sensing apparatus module. It is appreciated that a slide identification or sensing apparatus may also be a module of other instruments in a pathology or histology environment. These instruments include, but are not limited to, advance staining systems (in situ hybridization (ISH) systems), coverslip systems and slide storage systems.

In the description above, for the purposes of explanation, numerous specific details have been set forth in order to provide a thorough understanding of the embodiments. It will be apparent however, to one skilled in the art, that one or more other embodiments may be practiced without some of these specific details. The particular embodiments described are not provided to limit the invention but to illustrate it. The scope of the invention is not to be determined by the specific examples provided above but only by the claims below. In other instances, well-known structures, devices, and operations have been shown in block diagram form or without detail in order to avoid obscuring the understanding of the description. Where considered appropriate, reference numerals or terminal portions of reference numerals have been repeated among the figures to indicate corresponding or analogous elements, which may optionally have similar characteristics.

It should also be appreciated that reference throughout this specification to "one embodiment". "an embodiment", "one or more embodiments", or "different embodiments", for example, means that a particular feature may be included in the practice of the invention. Similarly, it should be appreciated that in the description various features are sometimes grouped together in a single embodiment, figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

What is claimed is:

1. An apparatus configured for sensing a specimen slide comprising:
   a receptacle comprising a slot configured for receiving a basket, the basket operable for containing a plurality of specimen slides therein;
   a push bar disposed in the receptacle, the push bar having an end to contact only one side of a single specimen slide in the received basket exclusive of any other specimen slide in the received basket, the push bar comprising a first position below a bottom surface of a base of the received basket and a second position in the slot; and
   a sensor focused in a direction of the slot operable to acquire information from the single specimen slide in the received basket.

2. The apparatus of claim 1, further comprising:
   a motor coupled to the push bar and operable to vertically move the push bar from the first position to the second position.

3. The apparatus of claim 1, further comprising a track in the slot operable to engage the received basket.

4. The apparatus of claim 3, wherein the track is operable to engage the base of the received basket and move the received basket in a horizontal lateral direction.

5. The apparatus of claim 4, wherein the base of the received basket comprises a pattern of a plurality of teeth and notches along a length dimension, the separation of adjacent teeth sufficient to accommodate a width of the single specimen slide and the track is operable to move the received basket in steps with each step equivalent to a spacing between adjacent teeth.

6. The apparatus of claim 5, further comprising a motor coupled to the track and operable to move the track.

7. The apparatus of claim 6, wherein the sensor is a first sensor, the apparatus further comprises a second sensor operable to detect a presence of the single specimen slide in the received basket.

8. The apparatus of claim 3, wherein the track comprises a belt.

9. The apparatus of claim 1, wherein the sensor is a first sensor, the apparatus further comprising a second sensor focused in a direction of the slot and operable to detect a presence of the received basket.

10. A slide staining system comprising a slide stainer configured for applying a stain to a specimen slide and the apparatus of claim 1.

11. An apparatus configured for sensing a specimen slide comprising:
    a receptacle comprising a slot configured for receiving a basket, the received basket operable for containing a plurality of specimen slides therein in a vertical position;
    a push bar disposed in the receptacle, the push bar having an end to contact only one side of a single specimen slide in the received basket, the push bar comprising a first position below a bottom surface of a base of the received basket and a second position in the slot sufficient to raise a portion of the specimen slide above a top of the received basket exclusive of any other specimen slide in the received basket;
    a track in the slot operable to engage the received basket;
    a motor coupled to the track and operable to move the received basket in predetermined steps; and
    a sensor focused in a direction of the slot operable to acquire information from the specimen slide when the specimen slide is in a raised position in the received basket.

12. The apparatus of claim 11, further comprising:
    a motor coupled to the push bar and operable to move the push bar from the first position to the second position.

13. The apparatus of claim 11, wherein the track is operable to move the received basket in a lateral direction into and out of the slot.

14. The apparatus of claim 11, wherein the track comprises a belt.

15. The apparatus of claim 11, wherein the sensor is a first sensor, the apparatus further comprising a second sensor focused in a direction of the slot and operable to detect a presence of the received basket.

16. The apparatus of claim 15, further comprising a third sensor operable to detect a presence of the specimen slide in the received basket.

17. The apparatus of claim 11, wherein the sensor is a bar code reader.

18. A method comprising:
    placing a basket comprising one or more specimen slides into a slot of a receptacle, the basket operable for containing a plurality of specimen slides therein in a vertical position between a base and a top of the basket;
    individually raising one of the one or more specimen slides from a respective position in the basket by contacting only one side of the one of the one or more specimen slides in a manner that is exclusive of contact of any other specimen slide in the received basket and pushing the one of the one or more specimen slides from an end at the base of the basket;

using a sensor, acquiring information from the raised specimen slide in the basket; and after acquiring information, lowering the raised specimen slide.

19. The method of claim 18, further comprising:

moving the basket in the slot in predetermined steps, each step equivalent to a distance between adjacent slides in the basket.

20. The method of claim 18, wherein the sensor comprises a bar code reader.

21. The method of claim 18, wherein the sensor comprises a first sensor, the method comprising sensing the presence of slides in the placed basket with a second sensor.

22. The method of claim 18, wherein the sensor comprises a first sensor, the method comprising sensing the presence of the basket in the slot with a second sensor.

\* \* \* \* \*